United States Patent [19]
Goldberg

[11] 3,807,355
[45] Apr. 30, 1974

[54] FLUIDIZING BED TANK
[75] Inventor: Newton N. Goldberg, Pittsburgh, Pa.
[73] Assignee: Westinghouse Electric Corporation, Pittsburgh, Pa.
[22] Filed: Mar. 28, 1972
[21] Appl. No.: 238,865

Related U.S. Application Data
[63] Continuation-in-part of Ser. No. 29,168, April 16, 1970, abandoned.

[52] U.S. Cl. .......................... 118/429, 118/DIG. 5
[51] Int. Cl. ...................... B05c 3/02, B05c 11/11
[58] Field of Search ...................... 118/DIG. 5, 429; 117/DIG. 6, 21

[56] References Cited
UNITED STATES PATENTS

| | | | |
|---|---|---|---|
| 2,310,894 | 2/1943 | Brusset | 118/DIG. 5 |
| 2,987,413 | 6/1961 | Dettling et al. | 118/DIG. 5 |
| 3,073,437 | 1/1963 | Petryk | 118/DIG. 5 |
| 3,401,795 | 9/1968 | Tauveron | 117/DIG. 6 |
| 3,464,384 | 9/1969 | Miller et al. | 118/429 |

Primary Examiner—John P. McIntosh
Attorney, Agent, or Firm—R. D. Furle

[57] ABSTRACT

A fluidizing bed tank is disclosed which has vertical walls enclosing a space, a horizontal porous gas diffuser plate between the walls, means for providing gas beneath the diffuser plate, and at least one horizontal protective screen between the walls and above the diffuser plate. The uppermost screen is at least about two-thirds of the distance down from the top of the tank to the diffuser plate. A second screen is preferably used when the heavy articles are to be coated.

10 Claims, 3 Drawing Figures

PATENTED APR 30 1974 3,807,355

FLUIDIZING BED TANK

CROSS-REFERENCE TO RELATED APPLICATIONS

This application is a continuation-in-part of my copending application Ser. No. 29,168, filed Apr. 16, 1970, titled "Fluidized Bed Coating Apparatus," now abandoned.

BACKGROUND OF THE INVENTION

In fluidized bed coating, the article to be coated is heated above the fusion temperature of the coating powder and is immersed into a tank containing coating powder which is "fluidized" or suspended by streams of inert gas. The fluidized powder strikes the article and fuses, the thickness of the coating depending primarily upon the temperature and heat capacity of article and the immersion time. The streams of gas required are generally produced by passing gas through a porous diffuser plate of, for example, porous ceramics, sintered glasses, sintered metal, cloth, fine-holed polyethylene, or even sheets of heavy perforated Kraft paper. To prevent gas from leaking around the diffuser plate and introducing turbulence or discontinuities in the fluidized powder, the diffuser plate is typically made an integral part of the tank, so that a broken or plugged up diffuser plate may mean that the entire tank must be discarded, which is expensive.

In the normal course of fluidized bed coating work any or all of the following problems might arise:

1. the hot object to be coated is inadvertently dropped into the fluidized bed tank before, during, or after being coated. This problem arises frequently when automated hangers or a conveyor are used to carry large parts into the tank. A falling article could break the porous plate or fuse the powder in the bed onto the porous plate causing a restriction in proper gas delivery into the bed.

2. the coating powder fuses and runs off the heated object to be coated. This molten material could fuse onto the porous plate and cause improper gas delivery into the bed.

3. a dropped heated article or molten powder running off an article could cause further fusion of powder around the article or the molten powder on the porous plate since the plate is usually a ceramic which will not readily conduct heat away from the article or molten powder.

The above problems would necessitate removing the powder from the tank, cleaning the tank, or possibly discarding the tank. This represents "down time" and is usually costly.

SUMMARY OF THE INVENTION

I have found that these problems can be substantially overcome without interferring with the flow of powder in the tank or significantly reducing the useful volume of the tank by placing a protective screen in the tank at least two-thirds of the way down from top of the tank to the diffuser plate. The screen catches and holds dropped articles and fused powder but permits the fluidizing operation to continue until a convenient stopping point, when the screen may be removed and cleaned.

DESCRIPTION OF THE INVENTION

Figure 1:
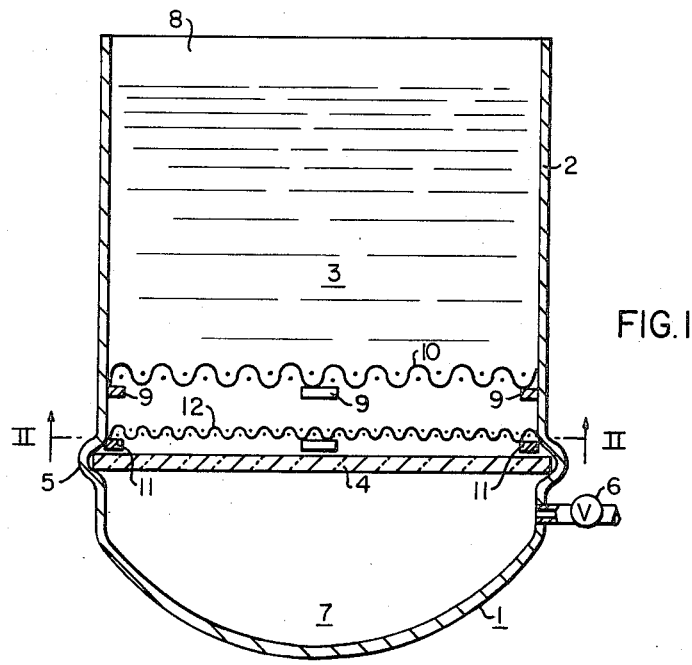
FIG. 1 is a vertical sectional view through a certain presently preferred embodiment of a fluidizing tank according to this invention.
Figure 2:
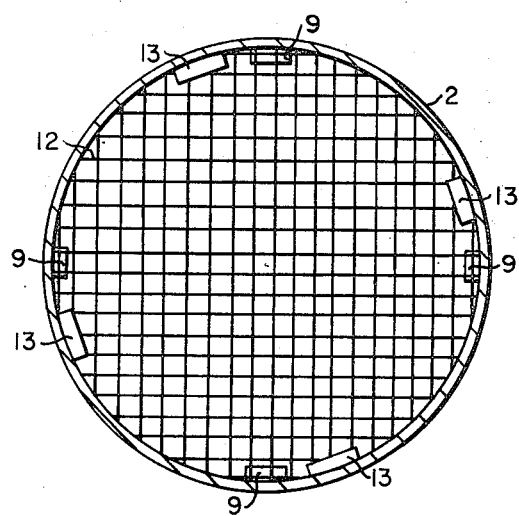
FIG. 2 is a horizontal sectional view through II—II in FIG. 1, with the upper screen removed.

In FIGS. 1 and 2 a tank 1 has vertical walls 2 enclosing space 3. Between the walls is a horizontal diffuser plate 4 held in place by recess 5. A gas, usually air, is admitted through valve 6 into lower chamber 7. The gas passes through the diffuser plate into space 3 where it fluidizes powder 8. Resting on four supporting members 9 (three shown) mounted on walls 2 is a large-sized upper screen 10. Below screen 10, resting on four supporting members 11 (three shown) which are mounted on walls 2, is a small-sized lower screen 12. Screen 12 has portions 13 removed (see FIG. 2) so that it can be lifted past supporting members 9 after a slight rotating movement.

The tank is typically steel, about 2 inches to 15 feet in useable depth, and is typically about 4 inches to about 3 feet in diameter if cylindrical and about 2 inches to about 6 feet wide by about 6 inches to about 12 feet long if rectangular. The diffuser preferably has a gas permeability which permits the passage of from 1 to 15 cubic feet of air at 70°F through an area of 1 square foot, the plate thickness being about one-fourth inch in small tanks to about 1 inch in larger tanks. The average pore diameter of the diffuser plate is preferably in the range of up to about 0.004 inch.

The coating material is in pulverulent form and has a particle size preferably of from about 0.001 to about 0.024 inches. The powder should rise at least an inch above the uppermost screen, for otherwise the tank would not be capable of coating articles of any practical size. More typically, the powder rises about 5 inches to three feet above the uppermost screen.

THE SCREEN

The uppermost screen should be at least two-thirds of the distance down from the top of the tank to the diffuser plate for if it is higher the capacity of the tank is unnecessarily reduced. On the other hand, the lowermost screen (which is the same screen if only one is used) is preferably about ½ to about 1½ inches up from the diffuser plate per foot of shortest distance between the walls. This latter preference permits the screen to deflect when an object strikes it without deflecting into the diffuser plate, but again preserves the coating capacity of the tank. The openings in the screen are preferably at least about one-sixteenth inch in order to permit the free upward movement of coating powder. However, the openings are preferably less than about one-half inch as a screen with larger openings is less effective in catching melted powder.

The screen should, of course, be of sufficient strength to catch and hold the article being coated. To be practical the screen should preferably be capable of catching a one pound steel ball dropped from a height of one foot onto its weakest spot. A screen which is capable of catching a steel ball weighing more than a 100 pounds dropped from a height of 1 foot onto its weakest spot is generally unnecessarily strong. While the screen may be woven wire, expanded metal, welded bars, etc., it is preferably wire which is welded at intersections at this type of screen has the greatest strength per unit weight.

In addition, to strength, the screen should not melt or weaken at 150°C (and preferably at 200°C) since with most coating powders articles must be heated above this temperature in order for fusion of the powder over the article to occur.

Finally, the screen is preferably thermally conductive so that heat will quickly be conducted away from molten powder dropping on it, causing the molten powder to solidify thereby preventing it from dropping onto the diffuser plate. Metal screens are for these reasons preferred, particularly steel and aluminum screens, but steel screens are best as they are strongest.

While ordinarily a single screen will be sufficient, if particularly heavy articles are to be coated (i.e. in excess of about 50 pounds), it is desirable to have an upper screen to absorb most of the shock of impact from the falling article and a lower screen to catch molten powder. In this case, the upper screen can be stronger and have wider spacing, (preferably about ½ to about 6 inches) so that the screen catches articles but not necessarily the molten powder.

The separation between the screens is preferably up to about 6 inches to allow for deflection of the upper screen without wasting tank capacity. The two screens are preferably combined into a compound screen having heavy widely separated bars, the spaces between them being filled with a finer-sized screen fixed to the bottom of the bars since only one screen must be supported and removed.

Figure 3:
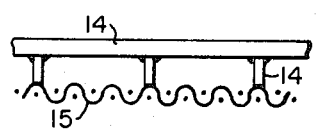
FIG. 3 illustrates a section of compound screen for use when coating heavy objects.

FIG. 3 illustrates such a screen, where welded bars 14 form a heavy, screen for catching articles and finer screen 15 welded to the bottom of the bars catches molten powder.

Provision should be made for removing the screens for cleaning, such as that shown in the drawings.

The screens may be held in place by supporting member fixed to the walls of the tank as in FIG. 1, by legs attached to the screens themselves, or by other suitable means.

I claim as my invention:

1. A fluidizing bed tank comprising:
    a. vertical walls enclosing a space;
    b. a horizontal porous gas diffuser plate between said walls;
    c. means for providing gas beneath said diffuser plate;
    d. a lowermost horizontal protective screen between said walls above said diffuser plate but not in contact therewith, and having a porosity greater than said diffuser plate, and
    e. an uppermost horizontal protective screen between said walls above said lowermost horizontal protective screen, having a porosity greater than said lowermost horizontal protective screen.

2. A fluidizing bed tank according to claim 1 wherein the openings in said lowermost screen are about one-sixteenth to about ½ inch and the openings in said uppermost screen are about ½ to about 6 inches.

3. A fluidizing bed tank according to claim 1 wherein each screen is detachably mounted on support members fixed to walls.

4. A fluidizing bed tank according to claim 1 wherein said walls extend about 2 inches to about 15 feet above said diffuser plate.

5. A fluidizing bed tank according to claim 1 wherein each screen has sufficient strength to catch without breaking a one pound steel ball dropped from a height of 1 foot.

6. A fluidizing bed tank according to claim 1 wherein the screen which is lowermost is about ½ to about 1½ inches above said diffuser plate per foot of shortest distance between said walls.

7. A fluidizing bed tank according to claim 1 wherein each screen is welded wire.

8. A fluidizing bed tank according to claim 1 wherein each screen is steel.

9. A fluidizing bed tank according to claim 1 wherein the distance between said screens is up to about 6 inches.

10. A fluidizing bed tank according to claim 1 wherein said lowermost screen is fixed to the bottom of said uppermost screen.

* * * * *